Oct. 28, 1969  J. R. LODGE ET AL  3,475,191
INORGANIC FLAKE MATERIAL
Filed Sept. 7, 1966
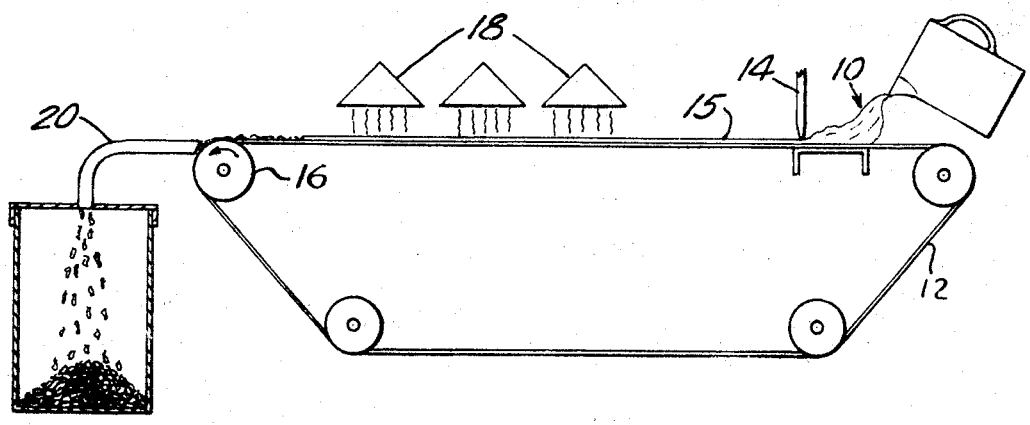
INVENTORS
JAMES R. LODGE
ANTHONY PAULETTI
BY
Carpenter, Kinney & Coulter
ATTORNEYS United States Patent Office 3,475,191
Patented Oct. 28, 1969

3,475,191
INORGANIC FLAKE MATERIAL
James R. Lodge, St. Paul, and Anthony Pauletti, North St. Paul, Minn., assignors to Minnesota Mining and Manufacturing Company, St. Paul, Minn., a corporation of Delaware
Filed Sept. 7, 1966, Ser. No. 577,694
Int. Cl. C08h 17/02; C09c 3/00
U.S. Cl. 106—288                  16 Claims

ABSTRACT OF THE DISCLOSURE

Durable colored decorative inorganic flakes of a substantially water insoluble reaction product of an alkali metal silicate and an insolubilizing agent for said silicate such as an acid or a kaolin clay, said flakes having a thickness less than about 10 mils and an average broad dimension at least four times the thickness being useful as a coating, for example for flooring or roofing or as a pigment material for paints.

---

This invention relates to inorganic decorative flake material, a method of making the same, and to coatings utilizing the same.

Compositions containing alkali metal silicates have been used as decorative coatings in outdoor surfacing for many years. For example, colored roofing granules have been produced by the silicate-clay coating process of U.S. Patent 2,379,358 (Jewett) granted June 26, 1945, and by the low temperature silicate "pickle" process of U.S. Patent 2,614,051 (Buzzell et al.) issued Oct. 14, 1952. In these processes the normally soluble silicate is rendered insoluble by heat treatment which causes reaction with hydrous clay in the silicate-clay method, or by heat and chemical treatment as in the "pickle" process. Also, other methods of insolubilization have been used from time to time, such as the use of fluoride salts in the silicate coating composition. These insolubilized silicate coatings have proved to be extremely durable, water resistant and fade proof under the most extreme conditions of outdoor exposure.

Flake pigments of various kinds have been used to provide nacreous and other special decorative effects. Such flakes have been formed from various organic polymers or natural mica flakes which were coated with metal oxide pigments. See for example Patent No. 3,087,829 (Linton) granted Apr. 30, 1963. Further types of flake pigments used in the past are metal flake pigments such as aluminum, often used to provide a metalized appearance, e.g. in automotive finishes.

The present invention utilizes the silicate coating technology to provide new inexpensive decorative flake materials of outstanding durability which provide their own characteristic pleasing appearance when used as surfacing or in finishes of various types. In addition to outstanding heat and weather resistance, the flake materials of this invention provide high hiding power and an attractive lustrous appearance due to their platelike character and their overlapping orientation when used in surface coatings. In addition to these effects, an unusual visual effect can be produced by the contrast of randomly distributed shiny and dull surfaces presented to the eye. Since the forming process used can produce flakes having a smooth shiny surface on one side, and a duller more matte finish on the reverse side, such flakes can be utilized in a coating to present a mixture of these textures. Such effects are particularly striking when the flakes form the outer surface of the coating. The flakes of this invention are also essentially insoluble in water, acids, and organic solvents. Decorative flake materials can be provided in which the individual flakes contain various well-known durable pigments (intended to include materials sometimes classified as dyes), such as chrome oxide green, phthalocyanine green, white titanium dioxide, red or yellow iron oxide, and cobalt blue, or they can be left unpigmented in which case they assume the natural creamy-white coloration of the silicate-clay binder. Further novel effects may be provided by the use of aluminum, bronze or copper powder within the flakes. In addition to use in various paint formulations, the flake pigments of this invention can be used, for example, as a decorative medium in ceramic bodies and glazes, in plastic resin coatings for flooring or walls, in asphalt paints for roofing, as a colored surfacing for asphalt shingles, or as a coloring medium for surfacing and marking highways and driveways. Many other uses will be obvious to those familiar with the art of protective and decorative coatings.

The flake pigments of this invention are different from currently available flake-like materials, in that, among other things, they may be completely inorganic in composition and highly heat resistant. They can be produced in a wide range of sizes, thicknesses and colors. When applied to the exterior of a surface coating, as when bonded directly to asphalt on a roofing shingle or asphalt highway, they provide a weather resistant non-organic colored surface that affords essentially complete coverage of the underlying organic substrate. This not only improves the weather and wear resistance of the substrate, but especially in the case of the roofing shingle, the essentially complete coverage of the black asphalt results in extremely bright and clean colors as compared to that provided by the usual mineral granule surfacing. This discovery is surprising since the art has developed for decades around the concept that granules coated with the colored silicate were necessary to provide protection for the underlying asphalt against the elements and to give the desired color. Now, for the first time, the expense of mining, crushing, grading and associated treatments of the base rock to form granules is obviated by the use of the flake pigments of this invention.

We have found that incorporating our flakes in clear resin coatings or other paint vehicles and applying these coatings as a paint produces an unusually attractive surface with a distinctive "sparkle." As compared to the above-mentioned colored mica flakes, our flake pigments can be produced in strong deep colored hues, or if desired, they may be a light pastel color. The flakes of our invention may be applied in a single color to a coating, or flakes of two or more colors may be used in admixture to give special multi-colored decorative effects. This, of course, would not be possible with ordinary powdered pigments in a single vehicle since two powdered pigments blend together to form a uniform third color.

Novel decorative effects can be achieved by blowing or sprinkling the flake materials of this invention over a tacky adhesive layer to form an adherent surface thereon. Surfaces thus produced tend to have a velevety or suede-like appearance, apparently due to the fact that some of the flakes become adhered in an upright or edgewise orientation. In such applications, it is preferred to use small flakes, generally having an average broad dimension of about 0.002 to 0.01 inch.

Aside from the various novel effects achievable with our flake pigments, they have certain advantages over conventional pigment powders and organic polymeric flakes. Paints made with ordinary pigments generally undergo degradation during outdoor exposure that gradually weathers away the organic binder and releases the fined pigment powders contained therein. It would be expected that this "chalking" would not likely occur with our relatively large platelike flakes. As the organic binder at the exposed surface weathered away, the flat silicate particles would remain adhered to the underlying binder and present a practically continuous weather-resistant, non-chalking layer.

When used as a decorative medium in resin floors, our flakes are found to be completely insoluble in the resins and solvents used, thus obviating the problem of color bleeding that is sometimes encountered with polymeric flakes and chips now in use.

The basic technology involved in insolubilizing alkali metal silicates by heating them with kaolin clay is described in the above-noted Jewett patent, but although this technology has now been available for a period of decades, insofar as we are aware, it has not been employed prior to the present invention for the formation of discrete flake or platelet-type decorative particles. The acid or acid salt "pickle" method of insolubilizing alkali metal silicates as described in the above-mentioned Buzzell et al. patent has likewise been known for years as have several other methods, but to our knowledge none of them have been used for this purpose.

The invention will be further understood in connection with the accompanying drawing which gives a schematic view of the process of this invention.

Briefly summarized, the method of this invention involves forming a liquid alkali metal silicate composition into a thin sheet or film, drying and firing the sheet at a predetermined temperature, and then breaking the sheet into flakes of random shapes of selected particle sizes. If desired, the sheet may be broken into flakes after drying but before firing. If the silicate composition contains kaolin clay, the heat treatment alone serves to insolubilize it. If the composition chosen does not contain kaolin, and a lower firing temperature is preferred because of heat sensitive pigments or for other reasons, insolubilization may be achieved by treating the flakes with an acid or acid salt pickling solution following the heating step.

As shown in the drawing, a slurry 10 may be cast out onto a smooth surfaced endless belt 12 and formed into a uniform thickness layer 15 thereon, for example, by means of a doctor blade 14. Belt 12 may be driven by a suitable driven roller 16. Layer 15 may be dried while carried by belt 12 by means of a suitable heating means, such as radiant electric heaters 18. The dried layer generally tends to crack and separate somewhat from belt 12, and can readily be removed therefrom, for example, by means of a vacuum collector device 20. The collected flakes are then fired to the insolubilization temperature of the composition in a suitable kiln which may be either of a stationary or moving bed type. It is preferable to form the sheets by applying the liquid composition onto a smooth flat surface such as polished metal, polypropylene or polyethylene terephthalate, which will release the coating on drying. The coating may be carried out by applying a slurry of the materials to the surface by spraying, knife coating, roll coating or dipping. Coloring of the flakes is accomplished by incorporating any suitable pigment or combination of pigments into the slurry.

In the flakes of our invention we generally prefer to use the silicate-clay compositon, particularly when high temperature resistant pigments are utilized. Since this process does not rely on any treatment other than heating to achieve insolubility, it lends itself well to efficient uncomplicated manufacturing procedures.

When lower firing temperatures are desired, due to the heat sensitivity of pigments used, we prefer the acidic pickle process, although chemical reactants such as aluminum fluoride, cryolite, or sodium fluosilicate may be incorporated in the silicate formula to provide neutralization during firing if preferred.

The preferred alkali metal silicate is sodium silicate although potassium silicate may be used. In the case of the silicate-clay compositions the preferred clay is a kaolin clay. With the latter compositions the firing temperature at which the clay and silicate react to form an insoluble reaction product is generally a temperature above that at which substantial dehydration of the alkali metal silicate occurs, but below the fusion point of the mixture, also normally below the fusion point of the sodium silicate. This temperature is normally in the range of 850 to 1000° F. and generally not higher than about 1450° F. Borax may be included in the formulation as taught in U.S. Patent 3,244,031 (Lodge et al.) issued June 7, 1966, to lower the insolubilization temperature to 700–800° F.

When the low temperature pickle process is used the general procedures are the same as above, but the firing conditions need only be sufficient to substantially dehydrate the film. For example, good insoluble flakes have been produced by this method by merely drying at 180° F., and then submerging the flakes in a dilute aluminum chloride solution followed by rinsing and drying.

In other cases where internal reactants, such as cryolite or aluminum fluoride, are mixed into the silicate composition before firing, the firing temperature necessary for insolubilization is in the range of about 400° to 600° F. In cases where firing temperatures are relatively high (above about 220° F.), it is preferred to dry the sheets or flakes in an oven prior to firing to avoid intumescence, or this step may be omitted if intumescence is desired. Drying and firing may be accomplished in the same heating device.

The fired sheets are easily broken into small flakes by crushing, agitating in a high speed blender, or merely by agitating with air in an enclosed vessel. The flakes are then graded by screening to obtain the desired particle sizes The flake pigments of this invention may be made in a wide range of particle sizes and thicknesses. The thickness of the particles ranges between 0.2 and 10 mils (0.005 to 0.025 mm.) and preferably 0.2 to 5 mils (.005 to 0.13 mm.), although somewhat thicker or thinner particles may be possible. The average broad dimension of the flakes may range between 0.002 inch (0.05 mm.) to 1 inch (25 mm.) or more, in certain applications. To maintain the flaky nature of the particles it is of course necessary that the average broad or flat dimension be greater than the thickness, preferably by a ratio of at least 4 to 1.

One important use of the flake pigments of this invention is a pigment in paint formulations, either alone or together with conventional paint pigments. The pigments can be used in various types of paint vehicles such as acrylics, alkyds, asphalts, drying oils, epoxies, cellulose derivatives, silicones, styrenes, urethanes, vinyls, etc. By "paint vehicle" as used herein is meant a binder which forms a film together with any voltaile solvent or thinner used therewith. Such solvents or thinners may include water, oil, or organic liquids. In such paint applications, flakes preferably have dimensions such that they will pass through screens having openings ranging in size from 0.04 mm. (325 mesh) to about 1.7 mm. (10 mesh, Tyler).

Novel decorative effects are also achieved by incorporating the flakes of this invention into transparent or tarnsclucent plastic resin compositions intended for coating floors, for example, with a monolithic coating. In such cases a range of particle sizes up to 1 inch (25 mm.) or more may be desired. Such floor coverings are often formed from epoxy and polyurethane resin formulations. Such compositions may also be used for forming wall coatings or tiles in which the flaks pigments of this invention may be incorporated, providing pleasing decorative effects. Similar effects may be provided by incorporating the flake pigments of this invention in ceramic glazes used in finishing ceramic tiles, pottery, or the like.

The flake pigments of this invention can be used as a surfacing material for roofing shingles over conventional asphalt coatings in place of conventional roofing granules. In such applications the flake pigments provide an exposed roofing surface which is durable and light weight.

The flake pigments may similarly be applied as a constituent of asphalt paints for cedar shingles or other roofing. Colored highway markings may also be provided by laying down an adhesive layer and applying the pigment flakes thereover, by incorporating the flake pigments in the adhesive composition, or both. Alternately they may be applied directly to the soft surface of asphalt paving when it is laid in place, and rolled out in a smooth adherent layer.

Although these pigments are not truly leafing pigments in the same sense as metallic flake pigments which float to the top of the carrier vehicle, a similar effect can be obtained by broadcasting the flakes on a wet film of binder.

In certain applications it may be desirable to modify the surface characteristics of our inorganic flake pigments. For example, improved wetting with organic binders can be achieved by reacting a fatty acid with acid insolubilized low-temperature flakes, or exposing high temperature silicate-clay flake pigments to a reactive organic silane such as amyl trimethoxy silane. In these cases the flakes are also rendered highly hydrophobic so that greatly improved bonding to an organic binder results even in an aqueous environment. By this means floating of the flake pigment on an aqueous latex binder system can also be achieved. A similar effect can be achieved by the use of certain organic cationic substances, such as tallow propylene diamine acetate, as a surface treatment on the flakes.

Inorganic flakes can also be made to float on liquid coating vehicles such as organic resin systems in solvent by coating the flakes with liquid repellent substances such as silicones or fluorochemicals. Such liquid repellent substances may include hydrophobic and/or oleophobic materials, the particular substance being selected to cause the flakes to float on the particular liquid vehicle employed in the coating composition. Examples are methyl hydrogen silicone fluids, polytetrafluoroethylene, or the acidified product of the potassium salt of N-ethyl, N-perfluoro-octanesulfonyl glycine.

Silicate materials in particulate spheroidal form have been used in pigment systems for paint-like coating compositions; see U.S. Patent 3,251,704 (Nellessen) issued May 17, 1966. Insofar as we are aware, however, highly weather resistant insoluble particulate flake materials of this invention having numerous advantages over spheroidal materials, as seen from the foregoing disclosure, have not been known prior to the present invention.

The invention will be further illustrated by the following examples in which all parts are given by weight, unless otherwise indicated.

EXAMPLE I

A slurry of the following composition was mixed and ball milled for 18 hours:

| Ingredients: | Parts |
| --- | --- |
| Sodium silicate solution (N Brand, 37.6% solids) Na$_2$O:SiO$_2$ ratio 1:3.22 | 50 |
| Kaolin | 10 |
| Borax (sodium tetraborate decahydrate) | 4 |
| Cobalt blue (pigment) | 10 |
| Water | 20 |

The slurry was spray coated onto a smooth flat clean sheet of chrome-plated steel to a thickness of about .002 inch (0.05 mm.) and dried at 180° F. for 5 minutes. On drying, the coating separated from the metal surface in large flakes. The dry flakes were fired by placing them in a cool oven and gradually increasing the oven temperature to 800° F. over a period of about 1½ hours. The fired blue colored flakes were then broken up and graded by screening.

EXAMPLE II

A slurry of the following composition was prepared as in Example I:

| Ingredient: | Parts |
| --- | --- |
| Sodium silicate solution (N Brand, 37.6% solids) | 40 |
| Kaolin | 25 |
| Borax (sodium tetraborate decahydrate) | 3 |
| Titanium dioxide pigment | 15 |
| Water | 30 |

The slurry was coated onto the surface of a web of smooth flat "corona" treated polypropylene-surfaced paper by knife coating, to a thickness of about .002 inch (0.05 mm.) and dried at about 180° F. for 1½ minutes. To accomplish this, the web of paper was pulled from a supply roll, through the knife coater where the silicate slurry was applied, then through a drying zone equipped with infra-red heaters and hot air blowers, over an idler roll, where its direction was reversed, and finally to a windup roll. As the silicate coating lost its moisture in the drying zone it separated from the resin treated paper in the form of loose sheets and large flakes. These were removed from the web at the idler roll by means of a vacuum collector device. The material thus formed was heat treated in an oven at 800° F. as in Example I, and the resulting white flakes were comminuted and classified by screening into various particle sizes. These flakes were sized to approximately 35 mesh (0.42 mm.) and mixed with a latex resin. Just enough resin emulsion was added to wet the flages thoroughly. The mixture was troweled on a wall surface and provided a pleasing, textured surface.

EXAMPLE III

A slurry of the following composition was prepared as in the previous examples:

| Ingredient: | Parts |
| --- | --- |
| Sodium silicate solution (N brand, 37.6% solids) | 40 |
| Kaolin | 25 |
| Borax | 3 |
| Carbon black pigment (dispersed black) | 4 |
| Water | 30 |

The slurry was coated continuously by knife coating onto an endless belt of sheet aluminum surfaced with a thermoset melamine formaldehyde-acrylic polymer. The knife coater was adjusted to produce a coating about .0015 inch (0.04 mm.) thick (dry thickness). The belt with the silicate coating on it was passed through a heated section where the coating dried and separated from the resin surface of the belt. The large flakes thus formed were collected by suction, and the belt surface was brushed clean on its return trip to the coater section.

The black flakes thus produced were fired to 800° F. as in the earlier examples, and broken into the desired particle sizes.

Special decorative effects were obtained by using a clear resin-flake system over various background colors and designs. For example, mixed white and black flakes obtained form Examples II and III were used as decorative media when scattered over a solid blue-colored panel and sealed with a clear polyurethane resin. The clear polyurethane was spread uniformily in a thin layer over the flakes, resulting in a smooth, attractive, decorative surfacing material suitable for floor or wall covering.

Black flakes obtained from Example III were screened to $-28+60$ mesh size (Tyler, 0.59 to 0.25 mm.) by means of a Rotex screen. These flakes were applied to an asphalt impregnated and coated felt web on a pilot plant size roofing machine to produce a roofing element. The saturated felt was coated with a ⅛ inch (3.2 mm.) thick layer of asphalt heated to 375° F. (190° C.). A vibrating hopper was used to feed flakes uniformly to the moving web, thereby providing complete coverage of the asphalt coating. Excess flakes were removed, and the web was passed through two sets of press rolls to produce a smooth surface and to ensure proper embedding of the flakes in the asphalt. The finished web was cut into 36 inch, three tab, square butt shingles. The shangles were applied to a roof panel as in normal roofing practice. The resulting roofing had a pleasing slate-like appearance and an attractive luster caused by the reflectance difference between the opposite sides of the individual flakes.

EXAMPLE IV

The following slurry composition was prepared:

| Ingredient: | Parts |
| --- | --- |
| Sodium silicate solution (K brand, 42.9% solids; Na$_2$O:SiO$_2$ ratio 1:2.9) | 40 |
| Calcined clay icecap K) | 15 |
| Phthalocyanine green paste (20% solids) | 2 |
| Chromium oxide green pigment | 8 |
| Water | 5 |

Flakes were formed from this composition in the same manner as in Example II. The large flakes were removed from the web and dried in an oven at 250° F. for 15 minutes. They were then submerged in a 5% aluminum chloride solution and allowed to soak about 10 minutes. The solution was then diluted with four volumes of water and the entire mixture transferred to a stainless steel Waring Blendor, where it was agitated by the high speed impeller to reduce the size of the flakes. Flakes were thoroughly rinsed with water, collected on a filter and dried, after which they were separated into several particle size classifications by screening. The flakes produced in this example were bright green in color.

EXAMPLE V

A slurry of the following composition was prepared:

| Ingredient: | Parts |
| --- | --- |
| Sodium silicate solution (N brand, 37.6% solids) | 40 |
| Kaolin (Dover clay) | 25 |
| Borax | 3 |
| Cobalt Blue stain | 8 |
| Titanium dioxide pigment | 7 |
| Water | 30 |

Flakes were formed from this composition in the same manner as in Example III.

Clear polyester resin with benzoyl peroxide activator was poured into 3″ x 3″ (7.6 x 7.6 mm.) glass molds to a depth of 1/16 inch (1.6 mm.) and allowed to partially set (approximately 20 minutes). White and blue flakes obtained from Examples II and V having a thickness of about 2 mils (0.05 mm.) and a size range of ¼ inch to 35 mesh (6.4 to 0.42 mm.) were mixed in equal amounts and randomly scattered over the partially set resin. A thin coat of clear resin was poured over this and allowed to cure at room temperature. An attractive, smooth tile, suitable for flooring and wall covering, resulted.

A mixture of white and light blue flakes made in Examples II and V were used to make seamless flooring with a clear urethane resin system with the flakes being mixed directly into the resin. 7.5 parts of flakes and 2.5 parts of resin were mixed together, poured over an existing vinyl asbestor floor, and spread uniformly with a serrated trowel to a thickness of ⅛ inch (3.2 mm.). Upon curing, an attractively patterned seamless surface was obtained.

A paint was prepared using equal parts by weight of the light blue flakes prepared in Example V and reduced to a −200+325 mesh size (0.07 to 0.04 mm.) and a water emulsion of an acrylic polymer (46% solids) (Rhoplex AC33). The pigment was stirred into the emulsion and the mixture was then spread on a panel to a wet thickness of .01 inch using a doctor blade. Upon drying, the paint film exhibited excellent hiding power and color, and also exhibited a soft luster due to the reflection of light from the flat flake pigment particles. This paint also lent itself to application by brushing and spraying.

A mixture of white and blue flakes from Examples II and V were used to form a colored road surface. The flakes, having a thickness of two mils, were sized to +10−35 mesh Tyler (1.65 to 0.42 mm.). The flakes were mixed into a solvent-type acrylic resin (Rohm & Haas' Acryloid B44) in proportions of one part flakes to three parts resin. This mixture was brushed onto a clean asphalt road surface. The resulting light blue surface remained clean and bright colored even after being subjected to weathering and considerable vehicular traffic. In another application the flakes from Examples II and V were applied to a blacktop road surface coated with an asphalt based adhesive. After the asphalt adhesive had begun to set by evaporation of solvent, the flake-covered surface was rolled with a rubber roller to smooth it out and to insure good adhesion of the flakes to the coating. The resulting colored surface had excellent weathering properties and withstood automotive traffic very well.

EXAMPLE VI

| Ingredient: | Parts |
| --- | --- |
| Sodium silicate solution (N Brand, 37.6% solids) | 40 |
| Kaolin (Dover clay) | 25 |
| Borax | 3 |
| Chromium oxide green pigment | 15 |
| Water | 30 |

This slurry was formed into flakes as in Example III.

Green flakes obtained from Example VI were used to make seamless flooring with a urethane resin system. A two-part urethane resin was troweled on a clay tile floor to a thickness of ⅛ inch (3.2 mm.). The green-colored flakes, having a thickness of 1.5 mils (0.04 mm.) and screened to 65 mesh Tyler (0.21 mm.), were randomly scattered onto the uncured urethane surface. The cured resin formed a seamless floor having a pleasing, colorful appearance and a nonskid surface.

What is claimed is:

1. Durable, colored, weather-resistant, flat flakes having a thickness less than about 10 mils and an average major broad dimension of at least 4 times the said thickness, said flakes consisting essentially of:
   (a) a pigment and
   (b) the inorganic water-insoluble reaction product of essentially (1) an alkali metal silicate and (2) an inorganic insolubilizing agent for said silicate.

2. Flakes according to claim 1 wherein the said thickness is from 0.2 to 10 mils and the said average broad dimension is from 0.002 to 1 inch.

3. Flakes according to claim 1 having a smooth, glossy side and a reverse relatively dull matte finish side.

4. Flakes according to claim 1 wherein the said inorganic insolubilizing agent is selected from the group consisting of an inorganic acidic material and a hydrous clay.

5. Flakes according to claim 1 having a thin coating of a hydrophobic organic substance on the surfaces thereof.

6. Flakes according to claim 5 having a thin coating of an organic wetting agent on the surfaces thereof.

7. A composite sheet body for roofing and siding comprising a bituminous sheet material having a firmly adherent surfacing comprising flakes according to claim 1.

8. Surfacing comprising a substrate having a uniform coating of the flakes of claim 1 in firmly adherent contact therewith.

9. A resinous floor covering having an exposed surface layer of transparent resinous material with the flakes of claim 1 embedded therein.

10. A highway surfacing having the flakes of claim 1 in firmly adherent contact with an exposed surface thereof.

11. A paint-like coating composition comprising a liquid vehicle which forms a tack-free coating on a substrate upon curing containing as a pigmenting means flakes according to claim 1.

12. A composition according to claim 11 wherein said flakes have a surface coating thereon of a liquid-repellent substance which reduces wetting of said flakes by said vehicle whereby said flakes float on said vehicle.

13. A method of making durable, colored, weather-resistant flat flakes comprising:
forming an aqueous mixture consisting essentially of an alkali metal silicate and a finely divided pigment into a wet layer having a thickness when dry of 0.0002 to 0.01 inch,
dehydrating said wet layer to its dry thickness,
causing said alkali metal silicate to react with an inorganic insolubilizing agent for said silicate to form a water insoluble reaction product, and
breaking said dehydrated layer into flakes having the said dry thickness and an average broad dimension of about 0.002 to 1 inch, the ratio of said broad dimension to said dry thickness being at least 4 to 1.

14. A method according to claim 13 wherein said inorganic insolubilizing agent is an acidic material reactive with said alkali metal silicate and is applied as an aqueous solution to said alkali metal silicte subsequent to said dehydrating step, thus causing the said alkali metal silicate to form the said water insoluble reaction product.

15. A method according to claim 13 wherein said inorganic insolubilizing agent is a kaolin clay added to said aqueous mixture, and said alkali metal silicate is caused to react with said kaolin clay by means of a heat treatment carried out at a temperature between 700 and 1450° F.

16. A method according to claim 13 wherein said aqueous mixture is formed into said wet layer by casting onto a smooth carrier surface, and said dehydrated layer is removed from said surface by means of a vacuum collector device.

References Cited

UNITED STATES PATENTS 3,070,460  12/1962  Huppke _____ 106—84
3,138,475  6/1964  Schroder _____ 106—291

JAMES E. POER, Primary Examiner

U.S. Cl. X.R.
106—291, 308, 309; 117—100